(12) United States Patent
Mun

(10) Patent No.: US 10,821,798 B2
(45) Date of Patent: Nov. 3, 2020

(54) INSULATOR DEVICE FOR SUSPENSION OF VEHICLES

(71) Applicants: HYUNDAI MOTOR COMPANY, Seoul (KR); KIA MOTORS CORPORATION, Seoul (KR)

(72) Inventor: Junil Mun, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 35 days.

(21) Appl. No.: 16/440,553

(22) Filed: Jun. 13, 2019

(65) Prior Publication Data

US 2020/0180384 A1 Jun. 11, 2020

(30) Foreign Application Priority Data

Dec. 6, 2018 (KR) .................. 10-2018-0155994

(51) Int. Cl.
*B60G 17/08* (2006.01)
*B60G 13/08* (2006.01)

(52) U.S. Cl.
CPC ............. *B60G 17/08* (2013.01); *B60G 13/08* (2013.01)

(58) Field of Classification Search
CPC ............................... B60G 17/08; B60G 13/08
USPC .................................................. 280/124.155
See application file for complete search history.

(56) References Cited

U.S. PATENT DOCUMENTS

| 4,863,002 A * | 9/1989 | Kimberlin | ............ B60G 13/008 188/318 |
| 4,943,083 A * | 7/1990 | Groves | ................ B60G 17/015 188/266.1 |
| 8,479,859 B1 * | 7/2013 | Okamoto | ................. B60K 6/30 180/165 |
| 8,841,786 B2 * | 9/2014 | Tucker | ..................... F03C 1/26 290/1 R |

FOREIGN PATENT DOCUMENTS

| JP | 5-44618 U | 6/1993 |
| JP | H10-024720 A | 1/1998 |

* cited by examiner

*Primary Examiner* — Faye M Fleming
(74) *Attorney, Agent, or Firm* — McDonnell Boehnen Hulbert & Berghoff LLP

(57) ABSTRACT

An insulator device includes a middle cup including an exterior wall disposed at the center of the mounting hole of the main panel and joined to the rubber member, a horizontal wall of which an upper portion of the strut rod is held in the middle of the interior and a vertical wall spaced inwardly of the exterior wall, an upper cup including an upper plate covering the upper part of the rubber member and an upper wall formed between the exterior wall and the vertical wall to form an upper hydraulic chamber, and the upper cup of which a first opening is formed thereto, a first elastic member disposed within the upper hydraulic chamber, and a control unit that selectively supplies hydraulic pressure to the upper hydraulic chamber through the first opening.

10 Claims, 6 Drawing Sheets

INSULATOR DEVICE FOR SUSPENSION OF VEHICLES

CROSS REFERENCE TO RELATED APPLICATION

This application claims priority to and the benefit of Korean Patent Application No. 10-2018-0155994 filed in the Korean Intellectual Property Office on Dec. 6, 2018, the entire contents of which are incorporated herein by reference.

BACKGROUND

(a) Field of the Disclosure

The present disclosure relates to an insulator device for a suspension of a vehicle. More particularly, the present disclosure relates to an insulator device for a suspension of a vehicle whose elastic characteristics vary according to the vehicle driving conditions.

(b) Description of the Related Art

Generally, a suspension of a vehicle is installed between a vehicle body and a wheel, absorbing vibration transmitted from the wheel to the vehicle body, by elastically supporting load of the vehicle body. The suspension of the vehicle includes a shock absorber. The shock absorber includes a strut tube connected to the wheel and a strut rod movably mounted within the strut tube and connected to the vehicle body. By the vibration transmitted from the wheel to the vehicle body, the strut rod is inserted into the strut tube and buffered. A lower spring seat is fixed on the circumference of the strut tube, and an insulator connecting the strut rod to the vehicle body is connected to the top of the strut rod.

In addition, a strut bearing is installed on the lower side of the insulator, and an upper spring seat is assembled on the lower side of the strut bearing.

A coil type spring is installed between the upper spring seat and the lower spring seat.

The spring is compressed during the shock absorber operation and absorbs the vibration.

The insulator includes a main panel with a penetration hole at the center so that the upper end of the strut rod is inserted, a cup member assembled at the center of the penetration hole of the main panel to engage the end of the strut rod, and a rubber member filled and vulcanized between the main panel, the cup member and the steel sheet.

Ride comfort is determined by the rigidity of the vehicle in relation to the distance between the upper end of the rubber member and the vehicle body during rebounding and the handling performance is determined by the stiffness of the bumper between the lower end of the rubber member and the cup member.

However, the insulator according to the conventional art has a drawback that the shape of the rubber member is fixed and the optimal characteristic according to driving condition may not be realized.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an insulator device for a suspension of a vehicle which can change the characteristics of a rubber member of an insulator according to driving conditions of a vehicle, and thereby exhibit optimum performance required for each driving condition.

An insulator device for a suspension of a vehicle according to an exemplary embodiment of the present disclosure may include a main panel having a mounting hole formed at its center so as to insert a strut rod connected to wheels, a steel sheet disposed at a lower portion of the main panel, and a rubber member filled between the main panel and the steel sheet.

The insulator device may include an exterior wall disposed at the center of the mounting hole of the main panel and joined to the rubber member, a horizontal wall of which an upper portion of the strut rod is held in the middle of the interior and a vertical wall spaced inwardly of the exterior wall, an upper cup including an upper plate covering the upper part of the rubber member and an upper wall formed between the exterior wall and the vertical wall to form an upper hydraulic chamber, and the upper cup of which a first opening is formed thereto, a first elastic member disposed within the upper hydraulic chamber, and a control unit that selectively supplies hydraulic pressure to the upper hydraulic chamber through the first opening.

The middle cup and the upper cup may be disposed at the center of the mounting hole of the main panel and may be vulcanizedly adhered with the rubber member.

The upper cup may have an upper cup hole into which the end of the strut rod can be inserted.

The control unit may include a first hydraulic pump connected with the first opening of the upper cup, a first fluid storage connected with the first hydraulic pump and storing the fluid being transferred to the upper hydraulic chamber, a first valve that disposed between the first hydraulic pump and the first opening, and a controller collecting driving information from the vehicle to detect driving conditions, and controlling the operations of the first hydraulic pump and the first valve.

The upper plate of the upper cup may have a diameter greater than the diameter of the mounting hole of the main panel.

The insulator device may further include a lower cup mounted under the middle cup, of which a second opening is formed thereto and forming a lower hydraulic chamber with the middle cup, and a second elastic member disposed within the lower hydraulic chamber.

The control unit may selectively supply hydraulic pressure to the upper and lower hydraulic chambers through the first opening and the second opening respectively.

The vertical wall of the middle cup may extend downwardly therefrom, and the lower cup may include a lower plate covering the lower portion of the rubber member, and a lower wall formed between the exterior wall and the vertical wall to form a lower hydraulic chamber.

The control unit may further include a second hydraulic pump connected with the second opening of the lower cup, a second fluid storage connected with the second hydraulic pump, and in which the fluid transferred to the lower hydraulic chamber is stored, and a second valve disposed between the second hydraulic pump and the second opening and wherein the controller may control the operations of the first hydraulic pump, the first valve, the second hydraulic pump and the second valve.

The lower plate of the lower cup may have a diameter greater than the diameter of the mounting hole of the main panel.

The insulator device for a suspension of a vehicle according to an embodiment of the present disclosure can selectively vary the elastic characteristics of the rubber member according to the driving conditions of the vehicle, thereby achieving the optimum performance required for each driving condition.

In addition, effects obtainable or predicted by the embodiments of the present disclosure will be directly or implicitly disclosed in the detailed description of the embodiments of the present disclosure. That is, various effects to be predicted according to the embodiment of the present disclosure will be disclosed in the detailed description to be described later.

DETAILED DESCRIPTION

Figure 1:
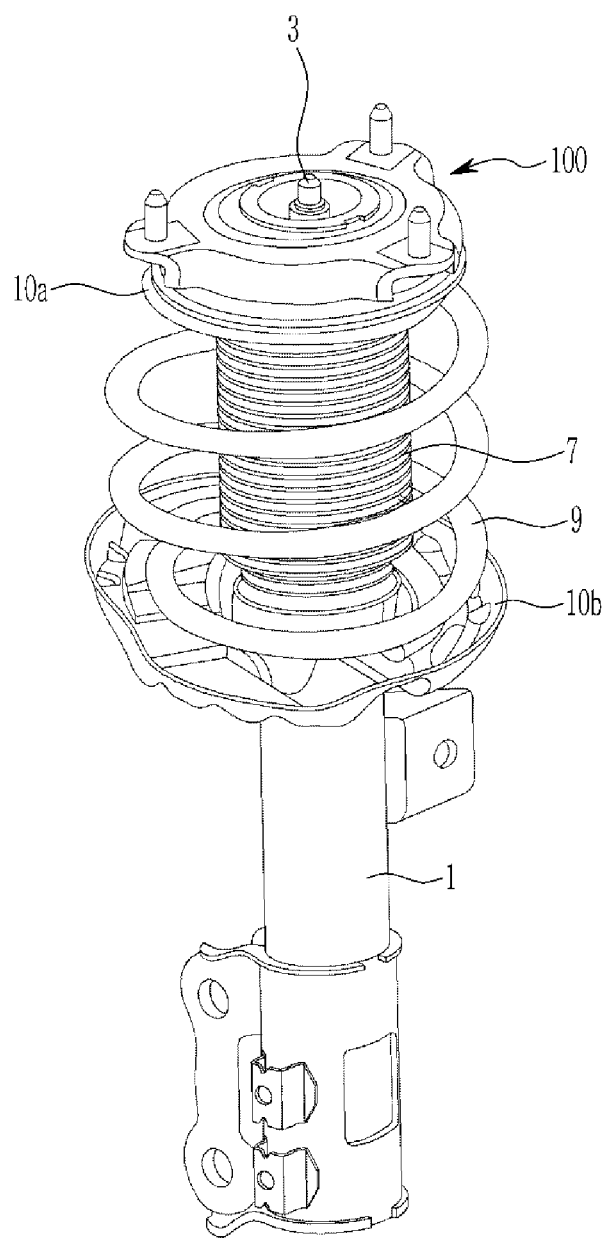
FIG. 1 is a perspective view of a suspension provided with an insulator device for a suspension of a vehicle according to exemplary embodiments of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly illustrate the present disclosure, parts not related to the description are omitted, and the same or similar components are denoted by the same reference numerals throughout the specification.

In the following description, dividing names of components into first, second and the like is to divide the names because the names of the components are the same as each other and an order thereof is not particularly limited.

Figure 2:
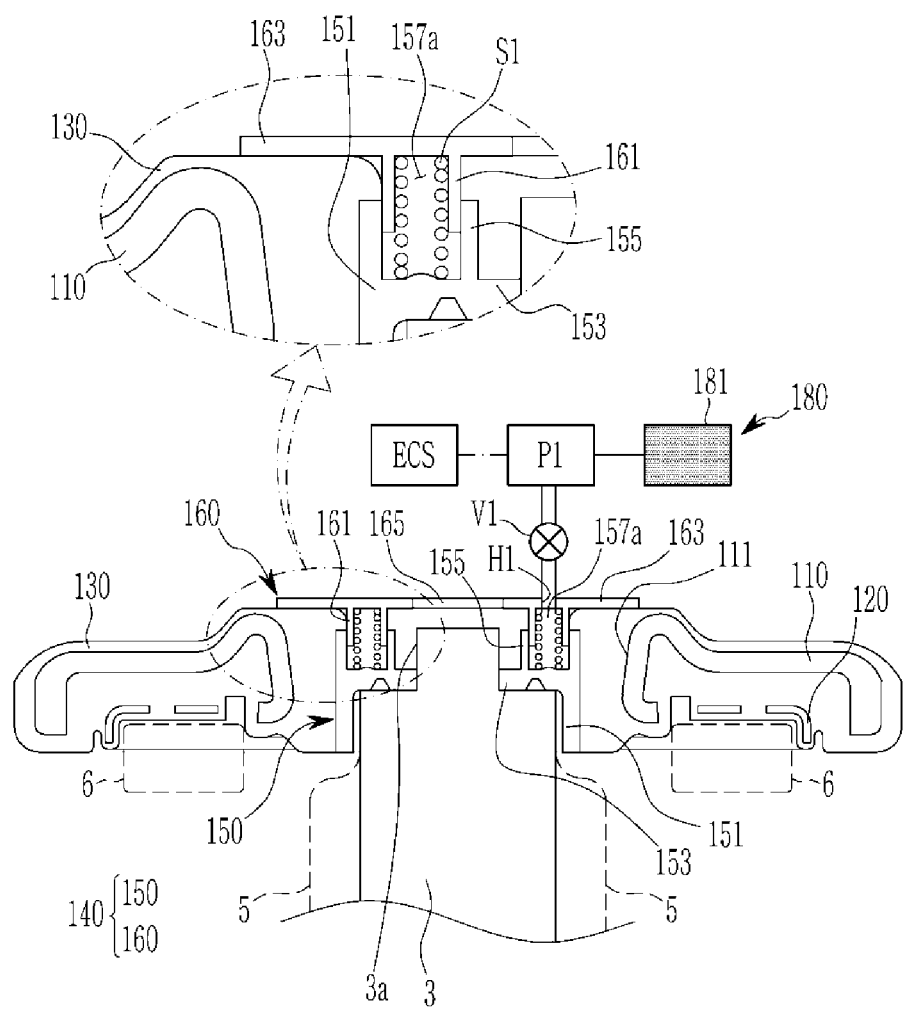
FIG. 2 is cross-sectional view of an insulator device for a suspension of a vehicle according to an exemplary embodiment of the present disclosure.
Figure 3:
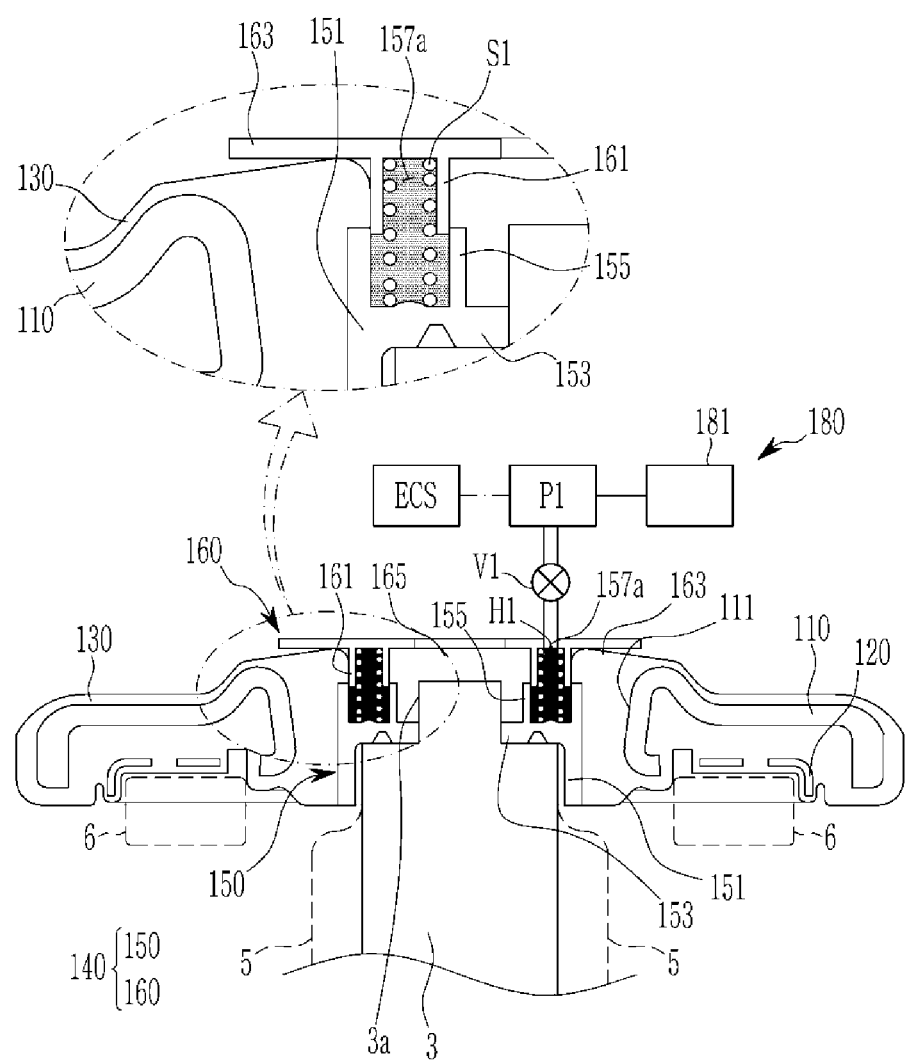
FIG. 3 is cross-sectional view showing an operation of an insulator device for a suspension of a vehicle according to an exemplary embodiment of the present disclosure.

FIG. 1 is a perspective view of a suspension provided with an insulator device for a suspension of a vehicle according to exemplary embodiments of the present disclosure, FIG. 2 is cross-sectional view of an insulator device for a suspension of a vehicle according to an exemplary embodiment of the present disclosure and FIG. 3 is cross-sectional view showing an operation of an insulator device for a suspension of a vehicle according to an exemplary embodiment of the present disclosure.

Referring to FIG. 1, an insulator device for a suspension of a vehicle according to exemplary embodiments of the present disclosure can be applied between a vehicle body and a strut rod connected to a wheel in a McPherson strut type suspension.

The suspension of the strut type includes strut 1 connected to the wheel and a strut rod 3 movably connected and inserted into the strut 1.

The strut rod 3 is filled with oil and the upper part of the strut rod 3 is connected to the vehicle body via an insulator device 100.

A bump stopper 5, shown in FIGS. 2 and 3, is coupled to the outer circumference of the strut rod 3, and a dust cover 7 is coupled to the outside of the bump stopper 5.

On the outside of the dust cover 7, a spring 9 is installed. An upper spring seat 10a and a lower spring seat 10b are coupled to the upper and lower portions of the spring 9, respectively. The spring 9 is formed in a coil type and disposed between the upper spring seat 10a and the lower spring seat 10b.

The upper spring seat 10a is coupled to the strut rod 3, and the lower spring seat 10b is coupled to strut 1. When the strut rod 3 is inserted into the strut 1, the spring 9 will absorb the impact by being compressed.

An insulator device 100 is installed on the strut rod 3 to connect the strut rod 3 to the vehicle body. The insulator device 100 contributes to improve ride comfort by buffering and absorbing engine vibration and impacts transmitted from the road surface during driving.

As shown in FIG. 2, the insulator device 100 includes a main panel 110, a steel seat 120, a rubber member 130 and a cup member 140. The cup member 140 includes a middle cup 150 and an upper cup 160. The main panel 110 has a mounting hole 111 formed at the center thereof and may be formed in a disc shape. The main panel 110 may be made of steel material. The steel seat 120 is disposed under the main panel 110.

A bearing 6 is seated on the bottom of the steel seat 120. In this case, the bearing 6 is configured to rotate the strut rod 3 when the wheel is steered, and this is a well-known known technology, so a detailed description thereof will be omitted in this specification.

The rubber member 130 is filled and vulcanized so as to surround the exterior surfaces of the main panel 110 and the steel seat 120. In addition, the rubber member 130 is vulcanized between the cup members 140 described below. The rubber member 130 absorbs the input load to attenuate the load, and the vibration caused by the minute load is stably attenuated by the rubber member 130.

Meanwhile, the cup member 140 is disposed at the center of the mounting hole 111 of the main panel 110 and is vulcanizedly adhered with the rubber member 130. The cup member 140 includes a middle cup 150 and an upper cup 160. The middle cup 150 is disposed in correspondence with the mounting hole 111 and is directly bonded to the rubber member 130. And the middle cup 150 is formed into a cylindrical shape having opened upper and lower ends.

The middle cup 150 includes an outer wall 151 formed in a cylindrical shape having upper and lower openings, and vulcanized and adhered to the rubber member 130.

The middle cup 150 includes a horizontal wall 153 formed along a central inner circumference with respect to the top and bottom of the exterior wall 151. In the horizontal wall 153, a penetration hole is formed at the center, and the upper part of the strut rod 3 is fitted.

In addition, the middle cup 150 includes a vertical wall 155 spaced apart from the exterior wall 151 by a predetermined distance.

In the middle cup 150 constructed as described above, an annular upper hydraulic chamber 157a is formed between the exterior wall 151 and the vertical wall 155 so as to be filled with fluid. The upper cup 160 is mounted on top of the middle cup 150. The upper cup 160 includes an upper plate 163 covering an upper region of the rubber member 130.

In the upper plate 163, a first opening H1 is formed in which the fluid is inflowed and exhausted. The upper cup 160 includes an upper wall 161 formed below the upper plate 163. The upper wall 161 is inserted between the exterior wall 163 and the vertical wall 155 to form the upper hydraulic chamber 157a.

A first elastic member S1 is installed between the horizontal wall 153 and the upper plate 163.

The upper cup 160 has an upper cup hole 165, and an end 3a of the strut rod 3 can be inserted into the upper cup hole 165 when the vehicle bumps and rebounds.

The insulator device 100 includes a control unit 180 which controls the relative position of the upper cup 160.

The control unit 180 includes a controller (ECS) that collects driving information from various sensors of the vehicle and detects driving conditions.

The sensor may include a vehicle speed sensor, an acceleration sensor, a gyro sensor, and the like.

This controller (ECS) outputs a predetermined signal according to the driving condition. The controller (ECS) is a controller that controls the overall operation of an insulator device 100 for suspension by an exemplary embodiment of the present disclosure. It can be implemented as an at least one control processor operated by a predetermined program. The controller (ECS) may include a series of instructions for carrying out the content according to the exemplary embodiment.

The control unit 180 includes a first hydraulic pump P1 communicated with the first opening H1 of the upper cup 160 through a connecting hose (not shown).

A first valve V1 is disposed between the first hydraulic pump P1 and the first opening H1. For example, the first valve V1 may be disposed in the connecting hose.

Depending on the operation of the controller (ECS), the first valve V1 is opened and closed and the oil is supplied/released from the first hydraulic pump P1 to the upper hydraulic chamber 157a as the first valve V1 is opened and closed.

Also, the control unit 180 includes a first fluid storage 181 that communicates with the upper hydraulic chamber 157a via the first hydraulic pump P1.

That is, the control unit 180 is configured such that the fluid is moved by the first hydraulic pump 181 as the first valve V1 is turned on/off by the controller (ECS).

The controller (ECS) collects the driving information of the vehicle, detects the driving condition, and outputs the predetermined signal according to the driving condition. Depending on the output signal of the controller (ECS), the first valve V1 and the first hydraulic pump P1 operate to control fluid flow between the first fluid storage 181 and the upper hydraulic chamber 157a.

For example, when the vehicle bumps into something, the first valve V1 is turned on, the first hydraulic pump P1 is activated and the fluid in the upper hydraulic chamber 157a is filled, then the first valve V1 is closed to block fluid movement. At this time, the volume of the upper hydraulic chamber 157a is increased, and the shape of the rubber member 130 is deformed as the upper cup 160 is relatively lifted.

Figure 4:
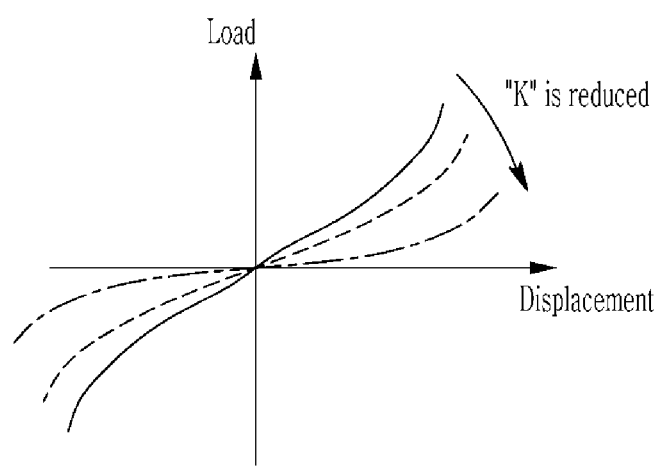
FIG. 4 is a graph showing elastic characteristics of a rubber member applied to an insulator device for a suspension of a vehicle according to exemplary embodiments of the present disclosure.

That is, as shown in FIG. 4, when the shape of the rubber member 130 is deformed, the elastic coefficient "K" of the rubber member 130 is relatively reduced, and the displacement of the rubber member 130 with respect to the load is increased.

On the other hand, when the vehicle rebounds, the first valve V1 is turned on and the fluid filled in the upper hydraulic chamber 157a flows to the first fluid storage 181 due to the restoring force of the first elastic member S1 mounted on the upper hydraulic chamber 157a, and then the first valve V1 is closed. Then, the volume of the upper hydraulic chamber 157a is reduced and the shape of the rubber member 130 is restored as the upper cup 160 is relatively lowered. That is, as shown in FIG. 4, the elastic coefficient "K" of the rubber member 130 is relatively increased, and the displacement of the rubber member 130 with respect to the load is reduced.

Figure 5:
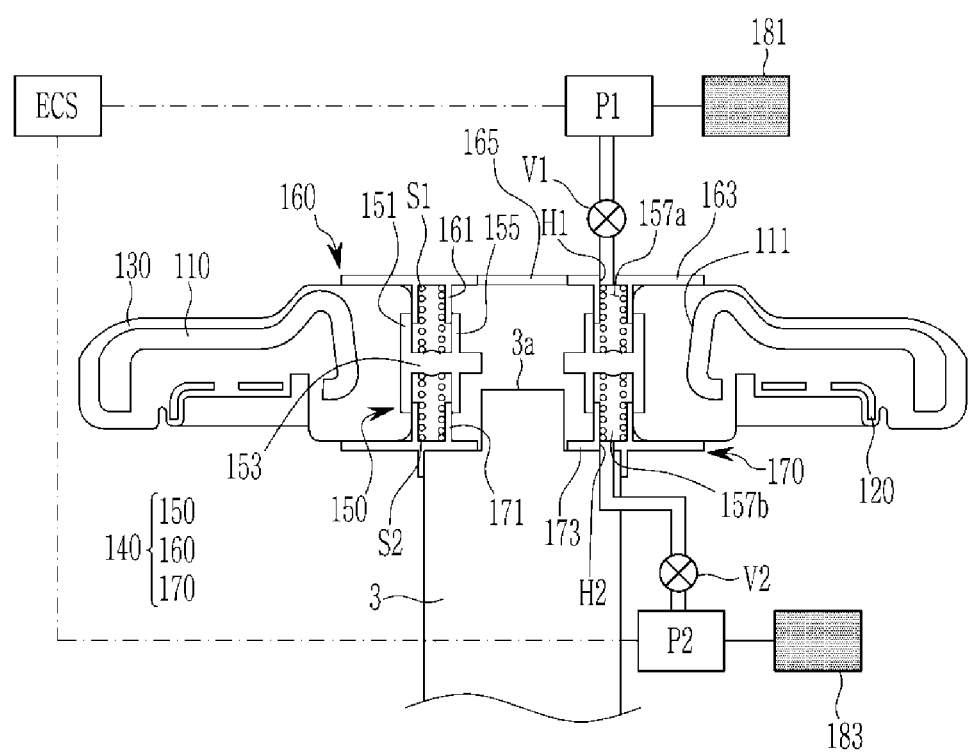
FIG. 5 is cross-sectional view of an insulator device for a suspension of a vehicle according to another exemplary embodiment of the present disclosure.
Figure 6:
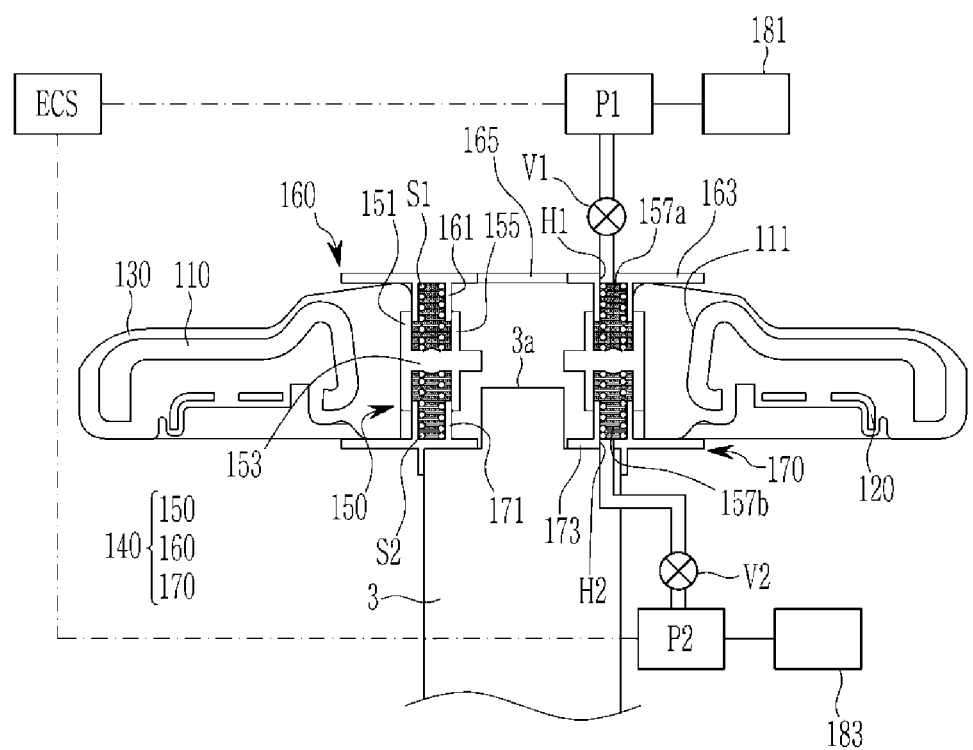
FIG. 6 is cross-sectional view showing an operation of an insulator device for a suspension of a vehicle according to another exemplary embodiment of the present disclosure.

FIG. 5 is cross-sectional view of an insulator device for a suspension of a vehicle according to another exemplary embodiment of the present disclosure, and FIG. 6 is cross-sectional view showing an operation of an insulator device for a suspension of a vehicle according to another exemplary embodiment of the present disclosure.

In comparison with the insulator apparatus according to the embodiment of the present disclosure shown in FIG. 2 and FIG. 3, the insulator apparatus according to another embodiment of the present disclosure further includes a lower cup 170.

Referring to FIG. 5, the vertical wall 155 of the middle cup 150 is extended to the lower side of the horizontal wall 153. The lower cup 170 is mounted under the middle cup 150. The lower cup 170 includes a lower plate 173 covering an under certain region of the rubber member 130. The lower plate 173 has a larger diameter than the mounting hole 111 and covers a predetermined area of the lower portion of the rubber member 130.

At the lower plate 173, a second opening H2 is formed in which the fluid is inflowed and exhausted. The lower cup 170 has a lower wall 171 formed on the lower plate 173. The lower wall 171 is inserted between the exterior wall 151 and the vertical wall 155 to form the lower hydraulic chamber 157b.

Also, a second elastic member S2 is installed between the horizontal wall 153 and the lower plate 173, i.e., within the lower hydraulic chamber 157b.

When the fluid inflows to the lower hydraulic chamber 157b, the inner volume of the lower cup 170 increases and the shape of the rubber member 130 is changed as the lower cup 170 relatively moves down. That is, as shown in FIG. 4, when the shape of the rubber member 130 is deformed, the elastic coefficient of the rubber member 130 is relatively reduced, and the displacement of the rubber member 130 with respect to the load is increased.

As described with respect to FIG. 2 and FIG. 3, the control unit 180 includes a controller (ECS) that collects driving information from various sensors of the vehicle and detects driving conditions. In addition, the control unit 180 includes a second hydraulic pump P2 communicated with the second opening H2 of the lower cup 170 through a connecting hose (not shown). A second valve V2 is disposed between the second hydraulic pump P2 and the second opening H2, for example the second valve V2 is disposed in the connecting hose. The second valve V2 is configured to open and close the connecting hose in accordance with the control of the controller (ECS).

The control unit 180 further includes a second fluid storage 183, which is connected with the second hydraulic pump P2 to store the fluid which may be supplied to the lower hydraulic chamber 157b. That is, the first and second valves V1 and V2 may be turned on/off by the control of the controller (ECS), and the fluid can be supplied/dispensed by the operation of the first and second hydraulic pumps P1 and P2.

The operation of the controller ECS enables simultaneous fluid supply to the upper fluid chamber 157a and the lower fluid chamber 157b.

The operation of the insulator device according to another exemplary embodiment of the present disclosure shown in FIG. 5 and FIG. 6 is the same as the operation of the insulator device according to the exemplary embodiment of the present disclosure shown in FIG. 2, and thus repeated explanations are omitted.

In FIG. 5 and FIG. 6, the second hydraulic pump P2 and the second fluid reservoir 183 are shown separately from the first hydraulic pump P1 and the first fluid reservoir 181. However, it is not limited thereto. That is, it is also possible to simultaneously supply the fluid to the upper fluid chamber 157a and the lower fluid chamber 157b through one hydraulic pump and one fluid reservoir.

According to exemplary embodiments of the present disclosure, the insulator device 100 can selectively control the characteristic of the rubber member 130 according to the driving condition of the vehicle, thereby achieving the optimum performance required for each driving condition.

Also, the insulator device 100 according to the exemplary embodiments of the present disclosure can vary the characteristics of the insulator according to number of the riding person and the loading condition, thereby reducing the performance scattering according to the weight condition.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An insulator device for a suspension of a vehicle including a main panel having a mounting hole formed at a center of the main panel so as to insert a strut rod connected to wheels, a steel sheet disposed at a lower portion of the main panel, and a rubber member filled between the main panel and the steel sheet, the insulator device comprising:
    a middle cup including an exterior wall disposed at the center of the mounting hole of the main panel and joined to the rubber member, a horizontal wall of which an upper portion of the strut rod is held in the middle of the interior and a vertical wall spaced inwardly of the exterior wall;
    an upper cup including an upper plate covering the upper part of the rubber member and an upper wall formed between the exterior wall and the vertical wall to form an upper hydraulic chamber, and the upper cup of which a first opening is formed thereto;
    a first elastic member disposed within the upper hydraulic chamber; and
    a control unit that selectively supplies hydraulic pressure to the upper hydraulic chamber through the first opening.

2. The insulator device of claim 1, wherein the middle cup and the upper cup are disposed at the center of the mounting hole of the main panel and are vulcanizedly adhered with the rubber member.

3. The insulator device of claim 1, wherein the upper cup has an upper cup hole into which the end of the strut rod can be inserted.

4. The insulator device of claim 1, wherein the control unit comprises:
    a first hydraulic pump connected with the first opening of the upper cup;
    a first fluid storage connected with the first hydraulic pump and storing the fluid being transferred to the upper hydraulic chamber;
    a first valve that disposed between the first hydraulic pump and the first opening; and
    a controller collecting driving information from the vehicle to detect driving conditions, and controlling the operations of the first hydraulic pump and the first valve.

5. The insulator device of claim 1, wherein the upper plate of the upper cup has a diameter greater than the diameter of the mounting hole of the main panel.

6. The insulator device of claim 1, further comprising:
    a lower cup mounted under the middle cup, of which a second opening is formed thereto and forming a lower hydraulic chamber with the middle cup; and
    a second elastic member disposed within the lower hydraulic chamber.

7. The insulator device of claim 6, wherein the control unit selectively supplies hydraulic pressure to the upper and lower hydraulic chambers through the first opening and the second opening respectively.

8. The insulator device of claim 7, wherein:
    the vertical wall of the middle cup extends downwardly therefrom, and
    wherein the lower cup comprises a lower plate covering the lower portion of the rubber member, and a lower wall formed between the exterior wall and the vertical wall to form a lower hydraulic chamber.

9. The insulator device of claim 8, wherein the control unit further comprises:
    a second hydraulic pump connected with the second opening of the lower cup;
    a second fluid storage connected with the second hydraulic pump, and in which the fluid transferred to the lower hydraulic chamber is stored; and
    a second valve disposed between the second hydraulic pump and the second opening; and
    wherein the controller controls the operations of the first hydraulic pump, the first valve, the second hydraulic pump and the second valve.

10. The insulator device of claim 8, wherein the lower plate of the lower cup has a diameter greater than the diameter of the mounting hole of the main panel.

* * * * *